(12) United States Patent
Willimann et al.

(10) Patent No.: US 8,461,247 B2
(45) Date of Patent: Jun. 11, 2013

(54) DISPERSION COMPOSITIONS FOR TILE ADHESIVES

(75) Inventors: Hongli Willimann, Baar (CH); Hans Wicki, Malters (CH); Ulf Kehrer, Hattersheim (DE)

(73) Assignee: Akzo Nobel N.V., Arnhem (NL)

( * ) Notice: Subject to any disclaimer, the term of this patent is extended or adjusted under 35 U.S.C. 154(b) by 416 days.

(21) Appl. No.: 11/909,194

(22) PCT Filed: Mar. 13, 2006

(86) PCT No.: PCT/EP2006/002280
§ 371 (c)(1),
(2), (4) Date: Jun. 2, 2008

(87) PCT Pub. No.: WO2006/099960
PCT Pub. Date: Sep. 28, 2006

(65) Prior Publication Data
US 2009/0192242 A1  Jul. 30, 2009

(30) Foreign Application Priority Data
Mar. 21, 2005 (DE) .................. 10 2005 012 986

(51) Int. Cl.
*C08J 3/02* (2006.01)
*C09B 67/00* (2006.01)
(52) U.S. Cl.
USPC .......................................... 524/501; 524/502
(58) Field of Classification Search
USPC .................................. 524/502, 501
See application file for complete search history.

(56) References Cited

U.S. PATENT DOCUMENTS

| | | | |
|---|---|---|---|
| 4,385,152 A | 5/1983 | Boyack et al. | |
| 5,747,578 A * | 5/1998 | Schmitz et al. | 524/502 |
| 6,262,163 B1 * | 7/2001 | Weitzel et al. | 524/460 |
| 6,559,236 B1 * | 5/2003 | Willimann et al. | 525/293 |
| 6,667,352 B1 * | 12/2003 | Kusters et al. | 523/201 |
| 2004/0077782 A1 * | 4/2004 | Heldmann et al. | 524/804 |

FOREIGN PATENT DOCUMENTS

| | | |
|---|---|---|
| EP | 0047993 A1 | 3/1982 |
| EP | 0466409 A1 | 1/1992 |
| EP | 466409 A1 * | 1/1992 |
| EP | 0654454 A1 | 5/1995 |
| EP | 0702057 A2 | 3/1996 |
| EP | 0728779 A2 | 8/1996 |
| EP | 728779 A2 * | 8/1996 |
| EP | 0757065 A2 | 2/1997 |
| EP | 0902769 A1 | 11/1997 |
| EP | 0959084 A1 | 11/1999 |
| EP | 0960891 A1 | 12/1999 |
| EP | 1110978 A1 | 6/2001 |
| EP | 1134255 A2 | 9/2001 |
| EP | 1262465 A2 | 12/2002 |
| WO | 9509210 A1 | 4/1995 |
| WO | 0005276 A1 | 2/2000 |
| WO | 0005283 A1 | 2/2000 |

OTHER PUBLICATIONS

Parker, S., ed. McGraw-Hill Dictionary of Chemical Terms. New York: McGraw-Hill Book Company, 1984.*
Odian, G. Principles of Polymerization, Fourth Edition. Hoboken, New Jersey: John Wiley & Sons, Inc., 2004.*

* cited by examiner

*Primary Examiner* — William Cheung
(74) *Attorney, Agent, or Firm* — Robert C. Morriss

(57) ABSTRACT

The invention relates to an aqueous dispersion and dispersion powder composition for highly flexible, waterproof, hydraulically binding tile adhesives having an extended open time, and containing an emulsion polymer (A) having a glass transition temperature ($T_g$) of approximately 10° C. to 80° C., and an emulsion polymer (B) having a glass transition temperature ($T_g$) of approximately −60° C. to +20° C. The difference of the glass transition temperatures ($T_g$) of the emulsion polymers (A and B) is at least approximately 5° C. The proportion of vinyl acetate monomer units is 0 to 70 mol-% and the minimum film forming temperature according to DIN 53787 of the 50% aqueous dispersion composition is approximately 15° C. or less, and the monomers, stabilization systems and optionally the additional additives of the dispersion and/or dispersion powder composition are selected such that a good cement compatibility is guaranteed. Due to the inventive dispersion and dispersion powder composition, tile adhesive can be produced in an economical manner which meets the requirements of C2S2- and C2ES2-norm according to EN12004.

7 Claims, No Drawings

DISPERSION COMPOSITIONS FOR TILE ADHESIVES

This application is the national stage under 35 U.S.C. 371 for international application number PCT/EP2006/002280 filed Mar. 13, 2006, which claims priority of Germany patent application 102005 012 986.2 having a filing date of Mar. 21, 2005.

The present invention relates to aqueous dispersion and dispersion powder compositions for highly flexible, waterproof, hydraulically binding tile adhesives having an extended open time.

In recent years, requirements for tile adhesives have become more and more defined. These requirements have been classified by means of clearly defined criteria so that grading can be performed as differentiated as possible yet still in an easy manner. For example, in European Standard EN12004, mortars containing cement (class "C" for cementious) are divided into those with normal requirements ("C1" defined as normal setting adhesives), as well as those with increased requirements or further characteristics (for example, "C2" defined as improved adhesives; referring to those having high initial tensile adhesion strengths of at least 1.0 N/mm$^2$ for all four forms of ageing as measured according to European Standard EN 1348:1997). An additional identification is provided for mortars having an "expanded open time" ("E", referring to those having tensile adhesion strength measured according to European Standard EN 1346 of at least 0.5 N/mm$^2$ following an insertion time of at least 30 min). Deformation of mortars containing cement is defined in European Standard EN12002. Here, thin mortar strips containing cement are produced (dimensions 280×45×3 mm) which, following ageing, are bent with a three-point bending load sufficient to fracture those strips. If the samples satisfy deformability between 2.5 and 5.0 mm, they are graded "S1", whereas those having deformability of 5.0 mm or greater are classified "S2".

While it has been possible for some time to formulate without problems tile adhesives having normal requirements (C1) using dispersion powder in order to obtain polymer-modified dry mortars, formulation of tile adhesives possessing higher quality has not been possible at all or only with major formulation effort. Tile adhesives of category C2S2, and more preferable of category C2ES2, for example, can generally be achieved only by addition of a high quality aqueous dispersion. This addition of an aqueous component accordingly complicates the production and logistics of such 2-component products. Although this 2-component product can be used, for example, in the installation of tile covers on terraces, screeds with floor heating, young cement surfaces or on critical building materials hostile to gluing, such as insulation boards or old tile covers, users would prefer to use dry mortars without the additional dispersion component.

A core-shell polymer powder produced by a 2-stage aqueous emulsion process is described in EP 654 454 A1. The two polymer phases have glass transition temperatures $T_g$ of −25° C. to −10° C. for the core polymer, and greater than +50° C. for the shell. The acrylate polymer shows an increased flexibility. Adhesion values are not mentioned. In addition, the high component of carboxyl groups, more preferably with high polymer amounts, has a tendency towards very unstable consistency and delay, which is not accepted by the user.

In EP 902 769 A1 flexible building material compounds of mineral binders and vinyl ester ethylene copolymers stabilized by protective colloids are described. These building material compounds have a high elongation that is equal to or superior to conventional surfactant-stabilized styrene acrylate dispersions. In order to achieve the necessary flexibility for sealing sludges, the copolymers exemplified have a correspondingly low glass transition temperature of −7° C. to −40° C. Tensile adhesion strengths, more preferably with higher polymer contents and following freeze-thaw and following heat ageing are not mentioned.

In EP 1 134 255 A2 polymer compositions in the form of aqueous dispersions or powders redispersible in water that are useful in providing flexible building material compounds such as sealing sludges are described. In order to obtain the necessary flexibility, a mixture of two different organo-silicon compounds is added to the powder composition, wherein at least one is present in salt form. As a result, the tear elongation of sealing sludge shoulder webs is improved. Tensile adhesion strengths of the compositions, including those with higher polymer contents following freeze-thaw and heat ageing, are not mentioned.

EP 757 065 A1 describes heterogeneously structured vinyl acetate/ethylene-copolymers in dispersion or redispersible powder form that are useful in building material formulations such as sealing sludges. As a result, the requirements on low temperature-resistant sealing sludges should be met even at −30° C. To this end, protective colloid-stabilized copolymers are produced with a glass transition temperature of −40 to +10° C. In addition to vinyl acetate, a first copolymer phase contains more than 40% by weight of ethylene, and a last copolymer phase consists of 5 to 40% by weight of ethylene. The products were developed for sealing sludges, but are less suitable for tile adhesives. No tensile adhesion strengths were given.

In publications EP 1 098 916 A1 and EP 1 102 793 A1 a new type of stabilization system is described that can be produced in-situ by use of a cationic monomer. Here, the wet adhesive strength in part is higher than the dry adhesion strength. The achievement of increased flexibility or improved open time is not mentioned, however.

U.S. Pat. No. 4,385,152 describes a mixture of two different surfactant-stabilized polymer components wherein the first component is a core-shell polymer used as film-forming cement coating. The core-shell dispersion is produced from a first reaction mixture having a glass transition temperature of 50° C. to 150° C. and a second reaction mixture having one of −10° C. to +10° C. The second dispersion preferably has a high component of methyl methacrylate. The averaged glass transition temperatures of both dispersions are greater than +25° C., necessitating the use of film-forming aids. The polymer mixtures are more suitable as cement coatings and less as mortar additive since a certain component of (meth)acrylic acid appears necessary, which can have a very negative effect on mortar characteristics. In addition they are only present in the aqueous phase and, because of their stabilization system, cannot be easily converted into dispersion powders redispersible in water. No details are given in terms of flexibility and tensile adhesion strength of polymer-modified mortars.

EP 702 057 A2 describes a mixture of a homo- or copolymer having a glass transition temperature of more than 20° C. and consisting of 85 to 100% by weight of at least one vinyl ester, preferably vinyl acetate, and a copolymer with a glass transition temperature of below 20° C., consisting of 45 to 98% by weight of at least one vinylester of carbonic acids with 1 to 18 carbon atoms as well as 2 to 50% by weight of at least 1 α-monoolefin with 1 to 4 carbon atoms. The dispersion mixtures, which can be dispersion powders, are suitable as adhesives for the bonding of porous and semi-porous substrates such as wood. Their application in hydraulically binding systems is not mentioned. Vinyl acetate homopolymers and vinyl acetate-rich copolymers in highly alkaline systems have a tendency towards hydrolysis and are thus not suitable for highly flexible waterproof tile adhesives.

EP 1 110 978 A1 describes a method for the production of polyvinyl alcohol-stabilized mixed polymers on the basis of vinylester and (meth)acrylic acid ester comonomers in form of aqueous dispersions and dispersion powders redispersible in water. Here, 50 to 100% by weight of the vinylester monomers, at least 80% by weight of the ethylene and 0 to 40% by weight of the (meth)acrylate monomers are added during polymerization. Stable and low-viscosity dispersions and corresponding redispersible, block-stable dispersion powders are obtained, which, when used in cement applications, have a fully satisfactory viscosity or cement stability and do not obstruct cement setting. The tear resistance and tear elongation of polymer/mortar films is substantially comparable with an ethylene-vinyl acetate dispersion powder and has no substantial improvements. Tensile adhesion strengths, preferably following wet and freeze-thaw ageing, are only moderately higher than the ethylene-vinyl acetate comparative powder. The requirements of the C2 standard are attained; however, the flexibility requirements for the C2S2 standard are not mentioned.

EP 1 262 465 A2 describes the use of dispersions and polymer powders redispersible in water based on protective colloid-stabilized copolymers of vinyl esters, (meth)acrylic acid esters and, if applicable, ethylene in mortar compounds. Here, the vinyl ester component, if applicable in the presence of ethylene, is polymerized in a first stage up to a turnover of 90 to 100% by weight. After this, the component of ester of the (meth)acrylic acid is added and polymerized in a second stage. Here, improved tear resistances are partly measured in tensile-tear elongation tests of polymer-cement films. Tensile adhesion strength values are little or not improved compared with the mentioned state of the art. With 4.5% powder, the requirements in terms of the C2 standard are achieved, even with the comparison powders. The flexibility requirements for the C2S2 standard are not mentioned. A further disadvantage of EP 1 110 978 A1 and EP 1 262 465 A2 is the relatively involved polymerization method, where vinyl ester and ethylene are initially copolymerized and subsequently the (meth)acrylate monomers. Since the vinyl esters and ethylene copolymerize very poorly with (meth)acrylate monomers, prior to their addition the residual monomer quantity either has to be severely reduced with elaborate and time-consuming methods, or an increased component of these monomers be removed at the end of polymerization by expensive physical methods such as steam stripping. Both possibilities severely increase manufacturing cost. In addition, a new dispersion has to be developed for every different ratio of (meth)acrylate copolymers to ethylene-vinyl acetate copolymers, which is highly involved and highly disadvantageous for downstream production.

In one aspect, the present invention provides aqueous dispersion and dispersion powder compositions by which highly flexible, waterproof, hydraulically binding tile adhesives can be formulated without major formulation effort. These adhesives can be classified as C2S2 or even C2ES2 with extended open time. In addition, the correctability of a tile placed in mortar containing the composition should be greater than 30 minutes. In order to obtain good values, even under extreme and long wet ageing phases and/or freeze-thaw cycles, in one embodiment the drop in tensile adhesion strength after these standard forms of ageing compared to tensile adhesion strength following dry ageing should only be approximately 50% or less in each case. In another embodiment, increased flexibility and tensile adhesion strength can be provided at low temperatures. This also requires a correspondingly low minimum film-forming temperature (MFFT).

According to one method of manufacture, dispersions according to the present invention can be produced by 1-stage polymerization. In one aspect, dispersions so produced can be further converted into dispersion powder by means of conventional technology. In another aspect, dispersions with a low content of volatile organic components (VOC) can also be obtained without major effort. In addition to a low residual monomer component, other aspects of the inventive dispersion or dispersion powder can be achieved without the help of coalescing agents. An additional aspect of dispersions or their powders produced according to the present invention is high flexibility in product development as well as product modification (i.e., new products can be produced without major effort by simply using existing raw materials and semi-finished products).

According to the present invention, when at least two different dispersions are combined with each other at the correct ratio and these dispersions satisfy certain criteria, dispersions and dispersion powders that provide flexible tile adhesives with extended open time are produced.

In one embodiment, aqueous dispersion compositions according to the present invention are produced from at least two different water-insoluble emulsion polymers. The aqueous dispersion compositions can also be converted to dispersion powders which are redispersible in water. The compositions can further contain other optional additives.

According to the present invention, the compositions include an emulsion polymer A having a glass transition temperature $T_g$ of approximately +10° C. to +80° C. and a second emulsion polymer B having a glass transition temperature $T_g$ of approximately −60° C. to +20° C., wherein the difference between the glass transition temperatures '$T_g$' of the emulsion polymers A and B is at least approximately 5° C. These emulsion polymers A and B can each contain approximately 0 to 70 mol % of vinyl acetate monomer units, based on the respective total monomer component of the individual emulsion polymers. Glass transition temperature ('$T_g$') and weight ratios of emulsion polymers A and B are such that a minimum film-forming temperature as determined by DIN 53787 of a 50% aqueous dispersion composition is approximately 15° C. or less. Monomers, stabilizing systems and, any additional additives of the dispersion composition are selected so that cement compatibility is ensured. Cement compatibility according to the present invention is determined by the ratio of time taken by a mixture of 10 g of cement in 190 g of water with 1.0 g of dispersion composition to form a transparent water phase of 25% of the total volume of water, cement and dispersion composition as compared to the corresponding time of the same cement/water mixture without dispersion composition, wherein the ratio of time is 0.3:1 or greater.

Emulsion polymers A and B of the aqueous dispersion compositions are not subject to any restrictions whatsoever with respect to the types of copolymers used. Copolymers based on ethylene vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene can for example be employed, wherein vinyl versatate is a branched $C_4$ to $C_{12}$ vinyl ester. In one aspect, the polymers can contain approximately 0-50% by weight of additional comonomers. In another aspect, the polymers can contain approximately 0-30% by weight, and even in a further aspect the polymers can contain approximately 0-10% by weight of additional comonomers.

In one embodiment, a content of copolymerized vinyl acetate for emulsion polymers A and B does not exceed approximately 70 mol-% in the respective emulsion polymer. In one aspect the vinyl acetate content is approximately 65 mol-% or less. In another aspect, the content is approximately 60 mol-% or less, and in even another aspect the vinyl acetate content is approximately 55 mol-% or less. Emulsion polymers according to the invention can also include vinyl acetate-free copolymers, wherein the vinyl acetate content in the emulsion polymer A and/or the emulsion polymer B amounts to approximately 0 mol-%. However, vinyl acetate-free copolymers also include copolymers having a vinyl acetate content approximately 5 mol-% or more, or, in another aspect approximately 10 mol-% or more, or even in a further aspect approximately 20 mol-% or more.

In another embodiment, approximately 2 to 80% by weight of (meth)acrylate monomer can be included in emulsion polymer A. In another aspect, approximately 5 to 60% by weight of (meth)acrylate monomer is included, or in event another aspect, approximately 10 to 50% by weight of (meth)acrylate monomer is included. In one aspect, approximately 15 to 35% by weight of (meth)acrylate monomer is included. Here it is immaterial if homopolymers of the (meth)acrylate monomers employed have a high or low glass transition temperature $T_g$ as long as the overall glass transition temperature $T_g$ of emulsion polymer A is in the inventive range.

Suitable monomer classes for producing emulsion polymer A and/or emulsion polymer B include, for example, linear or branched $C_1$ to $C_{20}$ vinyl esters, ethylene, propylene, vinyl chloride, (meth)acrylic acid and their linear or branched $C_1$ to $C_{20}$ alkyl esters, (meth)acrylamide and (meth)acrylamide with N-substituted linear or branched $C_1$ to $C_{20}$ alkyl groups, acryl nitrile, styrene, styrene-derivatives and/or dienes such as for example 1,3-butadiene.

Useful vinyl esters include linear or branched $C_1$ to $C_{12}$ vinyl esters such as vinyl acetate, vinyl stearate, vinyl formiate, vinyl propionate, vinyl butyrate, vinyl pivalate, vinyl laurate, vinyl-2-ethyl hexanoate, 1-methyl vinyl acetate and/or $C_9$ to $C_{10}$ and/or $C_{11}$ vinyl versatate, vinyl pyrrolidone, N-vinyl formamide, and N-vinyl acetamide, as well as vinyl esters of benzoic acid and p-tert-butyl benzoic acid. In one aspect, vinyl acetate, vinyl laurate and/or vinyl versatate are used for producing the emulsion polymers.

Examples of $C_1$ to $C_{12}$ alkyl groups of the (meth)acrylic acid esters and N-substituted (meth) acrylamides include methyl, ethyl, propyl, n-butyl, 1-butyl, t-butyl, hexyl, cyclohexyl, 2-ethylhexyl, lauryl, stearyl, norbornyl, polyalkylene oxide and/or polyalkylene glycol groups, more preferably methyl, butyl, 2-ethyl hexyl groups. In one embodiment methyl methacrylate, n-butyl acrylate, t-butyl methacrylate and 2-ethyl hexyl methacrylate are used as the acid esters.

Other comonomers can also optionally be polymerized in, such as maleic acid anhydrides, unsaturated dicarbonic acids and their branched or linear $C_1$- to $C_{20}$-esters. Other examples include itaconic acid, maleic acid and/or fumaric acid as well as their esters, multiply ethylenically unsaturated comonomers such as divinyladipate, diallylmaleate, allylmethacrylate or triallylcyanurate, divinyl benzene, butandiol 1,4-dimethacrylate, hexandioldiacrylate, triethylene glycol dimethacrylate, functional vinyl and/or (meth)acrylates monomers containing alkoxy silane, glycidyl, epihalohydrine, carboxyl, amine, hydroxylammonium and/or sulfonic acid groups can be copolymerized. Useful functional monomers include hydroxypropyl(meth)acrylate, N-methylolallylcarbamate, methylacrylamidoglycol acid methyl ester, clycidyl(meth)acrylate, vinyl sulfonic acid, N-methylol (meth)acrylamide, acrylamidoglycol acid, 2-acrylamido-2-methyl-propane-sulfonic acid, (meth)acryloxypropyltri (alkoxy)silane, vinyltrialkoxysilane, vinylmethyl-dialkoxysilane, wherein as alkoxy groups methoxy, ethoxy and/or sio-propoxy groups can be used, acetylacetoxyethyl (meth)acrylate, diacetone acrylamide, N-[3-(Dimethylamino)-propyl]methacrylamide, N-[3-(Dimethyl-amino) ethyl]methacrylate, N-[3-(Trimethyl-ammonium)propyl] methacrylamide chloride and/or N,N-[3-Chloro-2-hydroxypropyl)-3-dimethylammoniumpropyl](meth) acrylamide chloride. The component of these comonomers, based on total monomer component, can be approximately 0 to 30% by weight. In another aspect, their component weight can be approximately 0 to 20% by weight, or in another aspect, approximately 0.1 to 10% by weight. In one embodiment, the component of free carboxyl groups does not exceed approximately 10% by weight, or in another aspect, does not exceed approximately 5% by weight, or even in a further aspect, does not exceed approximately 3% by weight.

Based on the monomers employed, the glass transition temperature $T_g$ of each of the copolymers produced (and thus the emulsion polymers) can be both calculated empirically and determined experimentally. Empirical calculation can be accomplished by use of the Fox equation (T. G. Fox, BulL Am. Phy. Soc. (ser II) 1, 123 (1956), and *Ullmann's Encyclopedia of Industrial Chemistry*, VCH, Weinheim, Vol. 19, 4th Ed., Publishing House Chemistry, Weinheim, 1980, pp. 17-18) as follows:

$$1/T_g = X_a/T_{gA} + X_b/T_{gB} + \ldots + X_n/T_{gn}$$

wherein $X_a$ and $X_b$ are the mass fractures of monomers A and B employed (in % by weight), and $T_{gA}$ and $T_{gB}$, are the glass transition temperatures $T_g$ in Kelvin of the respective homopolymers of A and B. These are listed in, for example, *Ullmann's Encyclopedia of Industrial Chemistry*, VCH, Weinheim, Vol. A21 (1992), p. 169.

Another method of determining the glass transition temperatures $T_g$ of the copolymers is by experimental determination, for example, by means of differential scanning calorimetry ('DSC') wherein the midpoint temperature according to ASTM D3418-82 should be used. Experimental values so determined may not correspond exactly to the calculated values since the calculation is based on empirical foundations and does not agree to the same positive degree for all monomer combinations. Further, additional effects such as molecular weight, a possible block structure of the copolymers, a certain heterogeneity and the influence of the stabilization system can affect glass transition temperature $T_g$. If major differences exist between the calculated and experimental values, the experimental values are presumed valid.

To advantageously carry out the invention it is preferred that the glass transition temperature $T_g$ of the emulsion polymers A and B be within a certain range. In one embodiment, the glass transition temperature $T_g$ of emulsion polymer A is in a range from approximately 10° C. to 80° C.; in another aspect from approximately 15° C. to 70° C.; in even another aspect from approximately 20° C. to 50° C.; and in another aspect from approximately 25° C. to 40° C. In one embodiment, emulsion polymer B has a glass transition temperature $T_g$ of approximately −60° C. to +20° C.; in another aspect from approximately −50° C. to +10° C.; in even another aspect from approximately −30° C. to +5° C., and in another aspect from approximately −20° C. to 0° C.

In an embodiment according to the invention emulsion polymer A contains at least one monomer whose homopolymer has a glass transition temperature $T_g$ of greater than approximately 40° C.; in another aspect greater than approximately 50° C.; and in even another aspect greater than approximately 60° C. In one embodiment the monomer is present in emulsion polymer A in an amount of at least approximately 2 mol-%; in another aspect at least approximately 5 mol-%; in even another aspect at least approximately 10 mol-%; and in another aspect at least approximately 15 mol-%.

In formulations according to the present invention, the difference in glass transition temperatures $T_g$ of emulsion polymers A and B is at least approximately 5° C.; in another aspect at least approximately 10° C.; in even another aspect at least approximately 15° C., and in another aspect at least approximately 20° C. In choosing the weight ratios of the two emulsion polymers A and B and their glass transition temperatures $T_g$ according to one embodiment of the present invention, the minimum film-forming temperature (MFFT) according to DIN 53787 of the 50% aqueous dispersion composition is approximately 15° C. or less, or even approximately 10° C. or less, or in another aspect approximately 5° C. or less.

Emulsion polymers A and B can be obtained by various polymerization methods, for example, by emulsion polymerization, suspension polymerization, microemulsion polymerisation and/or inverse emulsion polymerisation. It is also possible to produce emulsion polymers A and B using the same type of polymerization, for example, both emulsion polymers are produced by emulsion polymerisation. Also, emulsion polymers A and B can be produced by different polymerization methods. For example, emulsion polymer A can be produced by microemulsion polymerisation, and emulsion polymer B produced by suspension polymerisation. In one embodiment, emulsion polymerization is used for producing emulsion polymers A and B, wherein the emulsion polymers are polymerized separately from each other.

According to one embodiment, the polymerization method and/or choice of monomers is controlled so that emulsion polymer A and/or emulsion polymer B have heterogeneous morphology. Here it is possible by choice of monomer to measure two different glass transition temperatures $T_g$. In this case, the copolymer phase with the greater component must be used to determine whether it is emulsion polymer A or B. With the same components, the arithmetic mean of the various glass transition temperatures $T_g$ measured applies.

Higher molecular weight compounds can be employed as stabilization systems for the production of emulsion polymers A and B according to the invention. These can be natural compounds such as polysaccharides, which, if applicable, are chemically modified, synthetic higher-molecular oligomers, polymers such as protective colloids, or polymers produced by monomers which at least in part have ionic character and which can be produced in-situ. It is also possible to use one stabilization system, or to combine different stabilization systems with one another. Both emulsion polymers can have the same or different stabilization systems. Useful stabilisation systems include those that allow conversion of the emulsion polymers and/or the dispersion composition into water-redispersible dispersion powders and/or dispersion powder compositions by drying.

Polysaccharides and their derivatives that can be used include cold water-soluble polysaccharides and polysaccharide ethers such as cellulose ethers, starch ethers (modified amyloses and/or amylopectin), guar ethers and/or dextrins. The polysaccharides can also be chemically modified. Examples are carboxymethyl, carboxyethyl, hydroxyethyl, hydroxypropyl, methyl, ethyl, propyl, and/or long-chained alkyl groups. Other natural stabilization systems include alginates, peptides and/or proteins such as gelatin, casein and/or soya protein. Examples include dextrins, hydroxyalkyl-cellulose and/or alkyl-hydroxyalkyl-cellulose.

Synthetic stabilization systems can consist of one or more polyvinyl pyrrolidones with molecular weights of 2000 to 400,000, fully or partly saponified and/or modified polyvinyl alcohols with an degree of hydrolysis of approximately 70 to 100 mol-%, or in another aspect, of approximately 80 to 98 mol-%, and a Hoppler viscosity in 4-% aqueous solution of 1 to 50 mPas, or in another aspect of approximately 3 to 40 mPas (measured at 20° C. according to DIN 53015), as well as melamine-formaldehyde-sulfonates,naphthalene-formaldehyde-sulfonates, block copolymers of propylene oxide and ethylene oxide, styrene-maleic acid and/or vinyl ether maleic acid copolymers. Higher-molecular oligomers can be nonionic, anionic, cationic and/or amphoteric surfactants such as alkyl sulfonates, alkylaryl sulfonates, alkyl sulfates, sulfates of hydroxylalkanoles, alkyl and alkylaryl disulfonates, sulfonated fatty acids, sulfates and phosphates of polyethoxylated alkanoles and alkyl phenols, as well as esters of sulfoambric acid quaternary alkyl ammonium salts, quarternary alkyl phosphonium salts, polyaddition products such as polyalkoxylates, for example, adducts of 5 to 50 mol of ethylene oxide and/or propylene oxide per mol on linear and/or branched $C_6$ to $C_{22}$ alkanoles, alkyl phenols, higher fatty acids, higher fatty acid amines, primary and/or secondary higher alkyl amines, wherein the alkyl group in each case can be a linear and/or branched $C_6$ to $C_{22}$ alkyl group. Useful synthetic stabilization systems include partially saponified, and optionally, modified, polyvinyl alcohols, wherein one or several polyvinyl alcohols can be employed together, if applicable, with minor quantities of suitable surfactants. Amounts of the stabilization systems based on monomer component employed can be approximately 1 to 30% by weight, or in another aspect approximately 3 to 15% by weight.

According to one embodiment at least one of emulsion polymers A or B is produced by a stabilization system obtained through radical polymerization of monomers, for example, in-situ. Such monomers can be, for example, (meth) acrylic acid, monomers with sulfonic acid groups and/or cationic monomers, such as described in EP 1 098 916 A and EP 1 109 838 A.

The type of initiator system used for polymerization is not restricted. However, in one embodiment initiators that form radicals under the reaction conditions are used. These include thermal initiator systems such as persulfates, for example, potassium, sodium or ainmonium persulfate, water and monomer-soluble azoinitiators such as azobisisobutyro-nitril, azobiscyanovaleric acid and 2,2'azobis(2-methylpropion-amidin)dihydrochloride, redox initiator systems consisting of oxidizing agents such as hydrogen peroxide, t-butylhydroperoxide, t-butylperoxide, isopropylbenzene-monohydroperoxide, cumolhydroperoxide, t-butylperoxopivalate, dibenzoylperoxide, bicyclohexylperoxy-dicarbonate, dicetylperoxydicarbonate, and reduction agents such as sodium, potassium, ammonium, sulfite and bisulfite, sodium, potassium, zinc formaldehyde sulfoxylate, as well as ascorbic acid. Oxidizing agents, if applicable, can be used alone, which, by thermal decomposition, can form free radicals, as well as catalytic initiator systems such as the system $H_2O_2/Fe^{+2}/H^+$. The component of initiators based on monomer component can be between approximately 0.01 and 5% by weight, and in another aspect between approximately 0.1 and 3% by weight.

In producing aqueous dispersion compositions according to the present invention, at least one emulsion polymer A and an emulsion polymer B can be employed. In this respect, the ratio of the solid components of emulsion polymer A to the solid components of emulsion polymer B can be approximately 99.9:0.1 to 0.1:99.9; in another aspect approximately 99:1 to 1:99; in even another aspect approximately 95:5 to 5:95, and in another aspect approximately 80:20 to 20:80.

In one embodiment according to the present invention, when selecting the monomers and stabilization systems, the dispersion composition obtained and, if applicable, also the individual emulsion polymers A and B have good cement compatibility. Cement compatibility is determined by the ratio of the time taken by a mixture of 10 g of cement in 190 g of water with 1.0 g of dispersion composition, based on solid content of the dispersion composition, in order to form a transparent water phase of 25% of the total volume of water, cement and dispersion composition as compared to the corresponding time of the same cement/water mixture without the dispersion composition. According to the present invention, the cement compatibility ratio can be approximately 0.3:1 or greater, in another aspect approximately 0.5:1 or greater, in even another aspect approximately 0.7:1 or greater; or in one aspect approximately 0.9:1 or greater. If dispersion powders redispersible in water are employed, prior mixing with cement and testing according to the same method is carried out to determine the cement compatibility of the dispersion powder. The test can be carried out in a measuring cylinder.

A film-forming aid and/or coalescing agent can be added to the aqueous dispersion composition in an amount of approximately 0 to 5% by weight, or in another aspect, approximately 0 to 2% by weight, based on copolymer content. In one embodiment the aqueous dispersion compositions and dispersion powder compositions are prepared without additional film-forming aids and/or coalescing agents, as they can diffuse over time from the polymer, resulting in embrittlement of the polymer. For this reason, emulsion polymerisation component B is needed to provide appropriate flexibility and gluing power, even at low temperatures.

Advantageous aqueous dispersion compositions include those having a low component of organic volatile components (VOC). Organic VOCs refer to those having a boiling point of less than 250° C. at normal pressure. These include, for instance, non-reacted monomers, non-polymerizable contaminations contained in the monomers and by products of the polymerization. In one aspect the aqueous dispersion compositions have VOC content of less than approximately 5000 ppm; in another aspect less than approximately 2000 ppm; in even another aspect less than approximately 1000 ppm; and in another aspect less than approximately 500 ppm based on polymer content.

One embodiment of the invention includes a dispersion powder composition redispersible in water that is obtained by drying an aqueous dispersion composition according to the invention. Optionally, further additives can be added before, during and/or after the drying. In one embodiment, the dispersion powder composition can be produced by drying either separately or jointly, emulsion polymer A, optionally with additives, and emulsion polymer B, optionally with additives. If the emulsion polymers are dried separately, the individual dispersion powders are mixed together after drying. Drying can be carried out by spray drying, freeze drying, fluidized-bed drying, roller drying and/or quick drying. According to one method, spray drying is used.

Here it is often advantageous if during the production of the dispersion powder composition redispersible in water if before, during and/or after the drying one or several water-soluble natural and/or synthetic polymers, preferably in a quantity of approximately 0.1 to 50% by weight, more preferably approximately 1 to 25% by weight and especially preferably approximately 3 to 15% by weight based on the solids content of the emulsion polymers to be dried are added to the emulsion polymer A and/or the emulsion polymer B. Preferred water-soluble polymers are one or different polyvinyl pyrrolidones, polysaccharide ethers, dextrins and/or part-saponified, if applicable, modified, polyvinyl alcohols with an degree of hydrolysis of 80 to 98 mol-% and a Hoppler viscosity in 4% aqueous solution of 1 to 50 mPas (measured at 20° C. according to DIN 53015).

Optional additives can also be added to the dispersion and/or dispersion powder composition wherein the addition can take place before, during and/or after the drying. In principle, there are no limits to the type of additives. Liquid additives are preferably added before or during drying, but can also be sprayed on to the powder subsequently. Additives in powder form are preferably added during or after the spray-drying, but can also be added to the dispersion mixture. It is immaterial if they dissolve, swell-up and/or remain in the solid state in the dispersion mixture for as long as they do not become severely lumpy and/or rapidly settle under the prevailing conditions. If applicable it is also possible to first dissolve or swell solid water-soluble or water-swellable additives in water and add these to the dispersion and/or dispersion powder composition as aqueous solution.

Preferred optional additives are full and/or part-saponified and, if applicable, modified polyvinyl alcohols, polyvinyl pyrrolidones, powdery and/or liquid defoaming agents and/or wetting agents, alkyl, hydroxyalkyl and/or alkylhydroxyalkyl polysaccharide ethers such as cellulose ethers, starch ethers and/or guar ethers, wherein the alkyl and hydroxyalkyl group typically is a $C_1$ to $C_4$ group, synthetic polysaccharides such as anionic, nonionic or cationic heteropolysaccharides, more preferably xanthan gum or Wellan gum, cellulose fibres, dispersing agents, superplasticisers, hydration accelerators, hydration retarders, air-entraining admixtures, polycarboxylate ethers, polyacrylamide, polyalkylene oxides and polyalkylene glycols wherein the alkylene group typically is a $C_2$ and/or $C_3$ group, wherein block copolymers are also included, water repellants such as silanes, siloxanes or fatty acid esters, thickeners, fillers such as carbonates, silicates, precipitated silicic acids, pozzolanes such as meta-kaolin and/or latent hydraulic components, wherein the component of the optional additives based on the polymer component is preferably approximately 0.01 to 250% by weight, more preferably approximately 0.1 to 100% by weight and especially preferably approximately 1 to 25% by weight.

The dispersion and/or dispersion powder compositions according to the invention are preferably used in hydraulically binding gypsum and/or cementious mortars, but can also be used in pasty adhesives which only have a minor amount of hydraulically binding components or none at all. The added amounts based on the dry mortar component preferably are approximately 0.1 to 100% by weight, more preferably approximately 0.5 to 50% by weight based on the polymer content of the dispersion and/or dispersion powder composition. Although the dispersion composition according to the invention and/or dispersion powder composition in highly flexible, waterproof, hydraulically binding tile adhesives are preferably employed with a typical polymer content of preferably approximately 5 to 30% by weight, more preferably approximately 7 to 15% by weight based on the dry mortar, they can also be used in systems which have a substantially smaller polymer content such as for example approximately 0.1 to 7% by weight, preferably approximately 0.3 to 5% by weight and more preferably approximately 0.5 to 3.5% by weight.

The aqueous dispersion composition according to the invention is preferably used in the produce of so-called 2-component systems, where a dry mortar, which, if applicable, can additionally contain a dispersion powder component, and, on the other hand, an aqueous dispersion component are mixed together with water on site. Another form of usage are pasty adhesives which, if applicable, can be mixed with cement and/or gypsum prior to usage.

The dispersion powder composition according to the invention is preferably admixed to the dry mortar during its preparation so that merely through mixing with water a polymer-refined, hydraulically binding system is obtained. If the emulsion polymers A and B are dried separately, they can either be subsequently admixed to the dispersion powder composition according to the invention or separately added to the mortar as individual component. A further special embodiment is that a dispersion powder, based on an emulsion polymer A or B, is added to the dry mortar and on mixing with water the emulsion polymer B or A is added in dispersion form.

Preferred, but not exclusive areas of application of the aqueous dispersion and/or dispersion powder composition are tile adhesives, thermal insulation mortars, levelling compounds, repair mortars, gypsum and/or lime and/or cement plasters, joint mortars, sealing sludges, putties, plywood mortars, wallpaper pastes, mortars for adhesive bridges, parquet adhesives, primers, adhesives for the gluing of wood, cardboard and/or paper, and/or powder paints.

The invention is explained by means of the following examples. Emulsion polymer and dispersion are each used as synonym.

EXAMPLE 1

Dispersion A (Disp.A) and comparative dispersion V-A (Disp. V-A) were produced in a known manner in a 2-litre glass reactor by semi-batch method. Polyvinyl alcohol with a degree of hydrolysis of 88 mol-% was used as stabilization system, and added as an aqueous phase. Dispersion B (Disp. B) and comparative dispersion V-B (Disp. V-B) were produced in a 8-litre agitating autoclave with the same stabilization system according to the same method. The reaction temperatures were between 78 and 90° C. each and the monomers were measured out and added over a period of 3 to 4 hours.

Comparative dispersion C (Disp. V-C) was produced in an 8-liter agitating autoclave according to Example 1 of EP 1 262 465 B1.

TABLE 1

Monomer composition and characteristics of the emulsion polymers used. The measurements of Disp. V-C indicated in EP 1 262 465 B1 are mentioned in brackets.

| Monomers (mol %) | Disp. A | Disp. B | Disp. V-A | Disp. V-b | Disp. V-C | |
|---|---|---|---|---|---|---|
| | | | | | Step 1 80% by weight | Step 2 20% by weight |
| Vinyl acetate | 64.5 | 53.6 | 87.3 | 74.5 | 51.2 | |
| VeoVa 9 * | 18.1 | | | | | |
| VeoVA 10 * | | | 12.7 | | | |
| Ethylene | | 46.4 | | 25.5 | 48.8 | |
| Butyl acrylate | 17.4 | | | | | |
| Methyl methacrylate | | | | | | 100 |
| FK ** [% by weight] | 51 | 53 | 49 | 55 | 54 965 (300) | |
| Visc *** [mPas] | 745 | 720 | 1865 | 1775 | >4000 (<1000) | |

TABLE 1-continued

Monomer composition and characteristics of the emulsion polymers used. The measurements of Disp. V-C indicated in EP 1 262 465 B1 are mentioned in brackets.

| Monomers (mol %) | Disp. A | Disp. B | Disp. V-A | Disp. V-b | Disp. V-C | |
|---|---|---|---|---|---|---|
| | | | | | Step 1 80% by weight | Step 2 20% by weight |
| Residual monomer contents [ppm] | 847 | 128 | 385 | 102 | | |
| $T_g$(calc.) [° C.] | 23 | −9 | 22 | 12 | −12 | 105 |
| $T_{g, mid}$ (exp) [° C.] | 20 | 2 | 30 | 19 | 8 (1) | ****** |
| MFFT [° C.] **** | 8 | 0 | 15 | 3 | 0 | |
| ZVK ***** | 0.9 | 0.9 | 0.9 | 1.0 | 0.8 | |

* VeoVa 9 and VeoVa 10 are the trade names of the company "Resolution" of the $C_9$ and $C_{10}$-vinyl versatates respectively.
** FK means solids content
*** Visc. stands for group field viscosity, measured at 20 rpm with spindle 3
**** Minimum film-forming temperature (MFFT) was measured according to DIN 53787
***** ZVK stands for cement compatibility (see Text). In the test, the emulsion polymers were used in the undiluted state.
****** If the glass transition temperature is calculated as single-phase terpolymer, $T_g$(calc.) is +6° C.

The increased residual monomers of Disp. V-C clearly show the difficulty encountered with such a 2-step polymerisation. Since residual monomers of the first step (vinyl acetate and ethylene) hardly polymerize with methyl methacrylate, these have to be removed before or after the second polymerization stage by an elaborate method, or a longer dwell time is required before the addition of the second monomer stage. Both are disadvantageous.

EXAMPLE 2

Production of dispersion powders (DP) redispersible in water took place as described in literature. Specifically, 7.5% by weight of a polyvinyl alcohol with a degree of hydrolysis of 88 mol % and a Höppler viscosity of 4 mPas were added to each of the emulsion polymers and the aqueous dispersion compositions prior to spray drying. Following successful spray drying the powders were mixed with 10% by weight of a commercially available carbonate.

TABLE 2

Dispersion powders produced and their content of emulsion polymers, based on the total quantity of dispersion.

| Dispersion [% by weight] | DP A | DP B | DP 1 | DP V-1 | DP V-2 |
|---|---|---|---|---|---|
| Disp. A | 100 | | 50 | | |
| Disp. B | | 100 | 50 | | |
| Disp. V-A | | | | 50 | |
| Disp. V-B | | | | 50 | |
| Disp. V-C | | | | | 100 |
| MFFT [° C.] * | 10 | 0 | 0 | 5 | 0 |
| Redispersibility | Good | Good | Good | Good | Good |
| ZVK ** | 1.2 | 0.9 | 1.1 | 1.4 | 1.1 |

* Minimum film-forming temperature (MFFT) of the 50% aqueous redispersion was determined according to DIN 53787.
** ZVK stands for cement compatibility (see Text).

The values clearly show that dispersion powders redispersible in water and dispersion powder compositions possess good redispersability and good cement compatibility.

The Table additionally makes clear the flexibility and simplicity by which merely varying the conditions of emulsion polymer A and B, a new dispersion composition and a new dispersion powder composition, respectively, can be obtained. To the expert it is clear that the properties in the mortar can be adapted to specific requirements. With Disp. V-C and DP V-2 this adaptation is not possible.

EXAMPLE 3

12.0 weight parts each of the dispersion powders and dispersion powder compositions indicated in Example 2 each were mixed with 88.0 parts by weight of a cementious tile adhesive recipe consisting of 53.4% by weight of quartz sand (0.1-0.3 mm), 44.4% by weight of Portland cement CEM I 52.5 R, 1.6% by weight of calcium formiate and 0.6% by weight of cellulose ether (Viscosity as 2% aqueous solution: equals 10'000 mPas). The mixing water content, based on total quantity of the dry mixture, was set so that slipping dimension according to EN 1308 is smaller than 1 mm.

300 g of dry mortar mixture each were supplied for the technical application tests. The indicated quantity of mixing water was added while agitating and during 60 seconds mixed with a 60 mm propeller agitator with a speed of approximately 950 rpm. In the process, the mortar was evaluated in terms of mixing characteristics (node formation and wettability). After a maturing time of 3 minutes the mortar was briefly mixed up manually once more, while the consistency (good, medium, poor) was evaluated.

For measuring the tensile adhesion strengths and the open time the mortar was applied with a 6×6×6 mm comb spatula at a 60° angle per ageing on a concrete slab following a zero-scrape. Following an insertion time (EZ) of 5 minutes (tensile adhesion strengths) and 30 minutes (open time, OT) respectively, 5×5 cm tiles were manually placed in the mortar bed and weighted with 2 kg for 30 seconds. The measurement of the tensile adhesion strengths (according to CEN EN 1348) took place with stoneware tiles after the respective ageing ("T"——dry ageing: 28 days at 23° C. and 50% relative humidity (RF); "N"=wet ageing: 7 days dry ageing and subsequently 21 days in the water bath); "FT"—freeze-thaw ageing: 7 days at 23° C. and 50% RF, 21 days in the water bath, 25 freeze-thaw alternating cycles with 2 hours of freeze ageing each followed by 2 hours of water ageing; "W"—heat ageing: 28 days at 23° C. and 50% RF, 14 days at 70° C. and 1 day at 23° C. and 50% RF; wherein with N/T and FT/T the tensile adhesion strength of the wet and freeze-thaw ageing is also stated in percent of the dry ageing) and the open time with an insertion time of 30 minutes (with stoneware tiles, according to CEN EN 1346) was determined after 28 days dry ageing. The horizontal deformation was determined according to EN 12002, wherein the samples were aged at 23° C. For the first 14 days the relative humidity was set to 100% and for the next 14 days to 50%. For determining the correctability according to DIN 18156 Part 3 the mixed mortar was initially applied to a concrete slab as with the adhesion tensile tests. The pressed-in stoneware tile however was slightly turned manually after 5 minutes by a 45° angle in one direction and back again. After a further 5 minutes this was repeated so often until the tile fell off. The time indicated corresponds to the time where the tile could be turned for the last time without falling off.

TABLE 3

Technical application characteristics of a simple tile adhesive recipe with an added amount of 12.0% by weight each of the produced dispersion powders and dispersion powder compositions. The abbreviations are explained in the text.

| | | DP A | DP B | DP 1 | DP V-1 | DP V-2 |
|---|---|---|---|---|---|---|
| Mixing water content | [% by weight] | 24 | 23 | 24 | 24 | 23 |
| Mixing characteristics | | good | good | good | good | good |
| Consistency | [N/mm$^2$] | good | good | good | good | good |
| Tensile adhesion strengths | T; [N/mm$^2$] | 2.59 | 1.96 | 2.28 | 2.47 | 2.66 |
| | N; [N/mm$^2$] | 1.13 | 1.19 | 1.09 | 0.80 | 1.21 |
| | NT; [%] | 44 | 60 | 48 | 32 | 45 |
| | FT; [N/mm$^2$] | 1.22 | 0.94 | 1.17 | 0.84 | 0.99 |
| | FT/T; [%] | 47 | 48 | 51 | 34 | 37 |
| | W; [N/mm$^2$] | 2.49 | 2.25 | 2.32 | 2.38 | 2.36 |
| Open time | [N/mm$^2$] | 1.05 | 0.46 | 0.65 | 0.52 | 0.29 |
| Correctability | [min] | 40 | 20 | 35 | 20 | 25 |
| Horizontal deformation | [mm] | 4.86 | 4.58 | 4.79 | 4.91 | 5.38 |

The values of Table 3 clearly show that inventive dispersion powder composition DP 1 has clear advantages over the other dispersion powders or dispersion powder compositions. Standards C2S2 and C2ES2, for example, are mostly satisfied without problems. The slightly scant value of horizontal deformation can easily be achieved by increasing polymer quantity (refer Table 4). The good value of the open time is emphasized by the long correctability. Dispersion powder composition DP V-1 containing vinyl acetate which are clearly too high compared with the inventive range shows a good tensile adhesion strength after drying and heat ageing. After the wet and the freeze-thaw ageing the values however fall below the value of 1.0 N/mm$^2$ demanded by the standard. Since the tensile adhesion strengths after wet and freeze-thaw ageing are only 32 and 34 respectively of dry ageing and thus the drop to the value after dry ageing is even clearly above the required 50% (68% and 66%), these dispersion powder compositions are not suitable for the application with C2S2 tile adhesives. Although the open time shows good values the correctability is rather low. The same applies to the DP V-2, which is based on the heterogenous ethylene-vinyl acetate-methylmethacrylate dispersion. Although the tensile adhesion strengths according to C2S2 standard are met, the drop of the tensile adhesion strengths according to wet and freeze-thaw ageing to the tensile adhesion strength after dry ageing however is similarly poor (only 45% and 37% of the dry value). In addition, the value of the open time (0.29 N/mm$^2$) clearly does not satisfy the demanded 0.5 N/mm$^2$ of the C2ES2 standard. The correctability also drops significantly compared with the inventive DP 1.

If dispersions Disp. A and Disp. B alone are sprayed to the dispersion powders DIP A and DP B not all requirements are met either. The tensile adhesion strengths and more preferably the values of the open time of the dispersion powder DP A clearly satisfy the required values of the C2S2 and C2ES2 standards. The drop of the tensile adhesion strengths following the wet and freeze-thaw ageing to the tensile adhesion strength after dry ageing is also approximately within the required range. Since the minimum film forming temperature of DP A with +10° C. is however relatively high this dispersion powder alone is not suitable for applications in low temperatures and more preferably not for the exterior. The dispersion powder DP B likewise shows good adhesion tensile values and a low drop of the tensile adhesion strengths after the wet and freeze-thaw ageing to the tensile adhesion strength after dry ageing. However, it just fails the standard for improved open time. The same applies to the horizontal deformation, which however can be easily adjusted by slightly increasing the dispersion powder content. Correctability is likewise clearly poorer than with the inventive DP 1.

EXAMPLE 4

Mortar mixtures were produced similar to Example 3 wherein the content of the dispersion powder composition was changed. The component of the mortar mixture was selected in each case that the sum of the two weight parts produced 100 each.

With an added amount of 10% of the respective dispersion powder composition a part of the measurements was repeated at a temperature of 5° C. in order to simulate cold temperatures as well.

The values of Table 4 clearly show that the flexibility measured by means of the horizontal deformation rises with increasing polymer content. It is noticeable that the inventive dispersion powder composition DP 1 after 5° C. ageing even shows a slightly increased flexibility while DP V-1 becomes clearly less flexible. It is further noticeable that following the wet ageing the tensile adhesion strength values of the inventive dispersion powder composition DP 1 with increasing polymer content rises and at 16% added polymer even exceeds the dry value, while DP V-1 with the exception of the highest polymer amount always produces approximately identical tensile adhesion strength values (0.72 to 0.88 N/mm² regardless of the polymer content.

wherein the difference of the glass transition temperatures $T_g$ of dispersions A and B is at least approximately 5° C., wherein dispersions A and B each contain approximately 0 to 70 mol-% of vinyl acetate monomer units, based on the respective total monomer component of the individual dispersions, the glass transition temperatures $T_g$ and the weight ratios of the dispersions A and B are adjusted so that the minimum film forming temperature according to DIN 53787 of a 50% aqueous dispersion composition is approximately 15° C. or less, and wherein the dispersion composition provides at 23° C. and ambient pressure a cement compatibility based on the ratio of the time taken by a mixture of 10 g of Portland cement CEM I 52.5R in 190 g of water with 1.0 g of dispersion composition based on solids content to form in a measuring cylinder a transparent water phase, which is determined visually, of 25% of the total volume of water, cement and dispersion composition, as compared to the corresponding time of the same cement/water mixture without dispersion composition, wherein the cement compatibility ratio is approximately 0.3:1 or greater, wherein the polymer particles of dispersion A and the polymer particles of dispersion B are polymerized separately, and wherein dispersions A and/or B further comprise high molecular weight stabilization systems in an amount of approximately 3 to 15% by weight, based on monomer component employed,

TABLE 4

Technical application characteristics of a simple tile adhesive recipe with different amounts of the dispersion powder compositions DP 1 and DP V-1 with standard conditions, wherein the recipes with 10% by weight of dispersion powder composition were also aged at 5° C. The abbreviations are explained in the text.

| | | Powder content 1) [% by weight] | | | | | | | | | | |
|---|---|---|---|---|---|---|---|---|---|---|---|---|
| | | 4 | | 8 | | 10 | | 5° C. ageing Powder | | 12 | | 16 |
| | | DP 1 | DP V-1 | DP 1 | DP V-1 | DP 1 | DP V-1 | DP 1 | DP V-1 | DP 1 | DP V-1 | DP 1 | DP V-1 |
| Mixing water content | [% by weight] | 26 | 27 | 24 | 25 | 24 | 25 | 24 | 25 | 23 | 24 | 19 | 21 |
| Mixing characteristics | | good | good | good | good | good | good | good | good | good | good | good | good |
| Tensile adhesion strengths [N/mm²] | T; [N/mm²] | 1.22 | 1.47 | 1.54 | 2.16 | 1.84 | 2.54 | 2.24 | 1.67 | 1.92 | 2.15 | 1.87 | 1.96 |
| | N; [N/mm²] | 0.87 | 0.77 | 0.88 | 0.83 | 0.95 | 0.72 | 1.00 | 0.74 | 1.21 | 0.88 | 1.92 | 1.18 |
| | NT; [%] | 71 | 52 | 57 | 38 | 52 | 28 | 45 | 44 | 63 | 41 | 103 | 60 |
| | FT; [N/mm²] | 0.91 | 0.87 | 1.00 | 0.98 | 0.99 | 1.01 | 2) | 2) | 1.19 | 0.89 | 1.18 | 0.14 |
| | FT/T; [%] | 75 | 59 | 65 | 52 | 54 | 40 | 2) | 2) | 62 | 41 | 63 | 7 |
| | W; [N/mm²] | 1.16 | 1.30 | 1.45 | 1.88 | 2.00 | 2.47 | 2) | 2) | 2.07 | 2.35 | 3.01 | 2.97 |
| Horiz. deformation | [mm] | 1.92 | 2.11 | 3.15 | 3.62 | 3.94 | 4.22 | 4.53 | 2.64 | 5.37 | 5.20 | 11.85 | 8.28 |

1) The powder content is based on the dispersion powder content employed in the dry mortar formulation.
2) No data available.

We claim:

1. A dispersion powder composition redispersible in water obtained by drying a dispersion composition, the dispersion composition comprising:

a dispersion A having a glass transition temperature $T_g$ of approximately 10° C. to 80° C., and a dispersion B having a glass transition temperature $T_g$ of approximately −60° C. to +20° C., wherein dispersion A and dispersion B are dried separately or jointly, and wherein the drying is performed by spray drying, freeze drying, fluidized-bed drying, roller drying and/or quick drying, and wherein the dispersion powder composition is redispersible in water.

2. The dispersion powder composition according to claim 1, wherein dispersion A has a glass transition temperature $T_g$ of approximately 20° C. to 70° C. and dispersion B has a glass transition temperature $T_g$ of approximately −50° C. to +10° C.

3. The dispersion powder composition according to claim 1 wherein the high molecular weight stabilization systems are chosen from one or a plurality of polyvinyl pyrrolidones, polysaccharide ethers, part-saponified and/or modified part-saponified polyvinyl alcohols with a degree of hydrolysis of 80 to 99 mol-% and a Höppler viscosity in 4% aqueous solution of 1 to 50 mPas (measured at 20° C. according to DIN 53015).

4. The dispersion powder composition according to claim 1, wherein the weight ratio of solids contents of the dispersion A to solids contents of dispersion B is approximately 95:5 to 5:95.

5. The dispersion powder composition according to claim 1, further comprising one or more water-soluble polymers in an amount of approximately 0.1 to 50% by weight, based on solids content of the dispersions to be dried, wherein the one or more water-soluble polymers are added to dispersion A and/or the dispersion B before and/or after the drying.

6. Method of preparing dry cementitious mortars with expanded open time according to EN 1346 comprising adding approximately 0.1 to 100% by weight, based on the polymer content, of the dispersion powder composition of claim 1 to the dry mortar component.

7. Method of preparing dry gypsum mortars comprising adding approximately 0.1 to 100% by weight, based on the polymer content, of the dispersion powder composition of claim 1 to the dry mortar component.

* * * * *